June 30, 1942.  J. A. HANLEY  2,288,449
CONVERTER UNIT
Filed Aug. 28, 1940  2 Sheets-Sheet 1

INVENTOR.
John A. Hanley.
BY
ATTORNEY.

June 30, 1942.  J. A. HANLEY  2,288,449
CONVERTER UNIT
Filed Aug. 28, 1940    2 Sheets-Sheet 2

INVENTOR.
John A. Hanley.
BY

Patented June 30, 1942

2,288,449

UNITED STATES PATENT OFFICE 2,288,449

CONVERTER UNIT

John A. Hanley, Noroton, Conn., assignor to Gillette Safety Razor Company, Boston, Mass., a corporation of Delaware Application August 28, 1940, Serial No. 354,491

2 Claims. (Cl. 200—87)

This invention consists of an improved direct current interrupting device or converter unit for use in connection with direct current service where it is desired to supply an intermittent current for operating a small motor of the vibratory type such, for example, as the vibratory motor of a dry shaving implement.

It has been found advantageous to employ vibratory types of motors in dry shavers because of their simplicity of construction and their small size and weight, the only detrimental feature being that the implement cannot be operated on direct current service. An object of the present invention is to provide a device, hereafter referred to as a converter unit, for interrupting direct current in a manner permitting the frequency of interruption to be controlled and in intermittent current to be transmitted to the motor in the desired frequency. Motors primarily designed for use on alternating current are generally limited to efficient use at 50 or 60 cycles. The converter unit of my invention may be adjusted also to permit the efficient running on 25 to 40 cycle service of motors designed for use at 50 or 60 cycles service. Ordinarily such service is not satisfactory for operating a motor designed for 50 to 60 cycles on account of the slower cutting speed and the tendency to heat developed in the implement.

With these conditions in view the invention, in one aspect, comprises a simply constructed and compact converter unit having input and output terminals, a common support for an electromagnet and reed adjustably mounted with its free end in proximity to the magnet, a fixed contact located adjacent to a vibratory portion of the reed and input and output terminal connections which include such magnet and reed in their circuit.

These and other important features of the invention will be best understood and appreciated from the following description of a preferred embodiment thereof, selected for purposes of illustration and shown in the accompanying drawings, in which.

Figure 1:
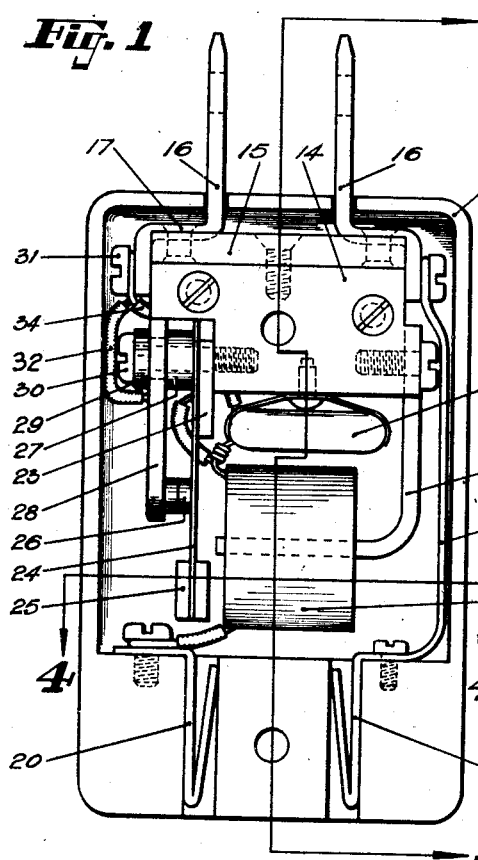
Fig. 1 is a plan view of the unit with the cover portion of the housing removed.
Figure 2:
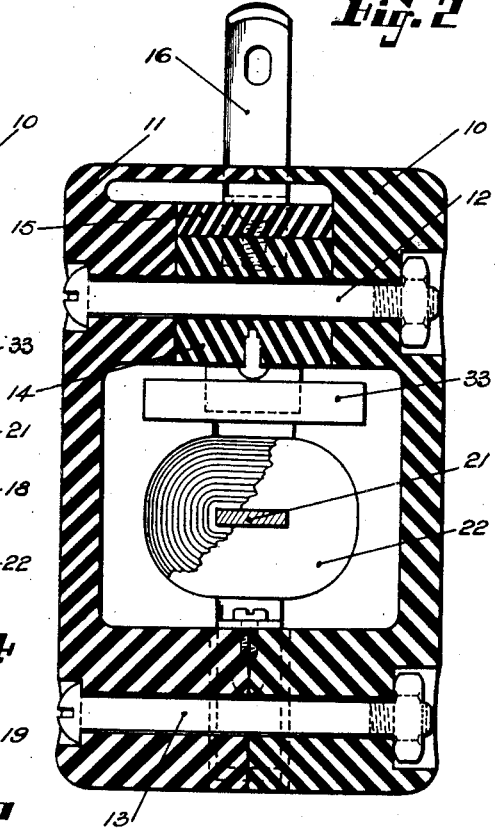
Fig. 2 is a view in longitudinal section.
Figure 3:
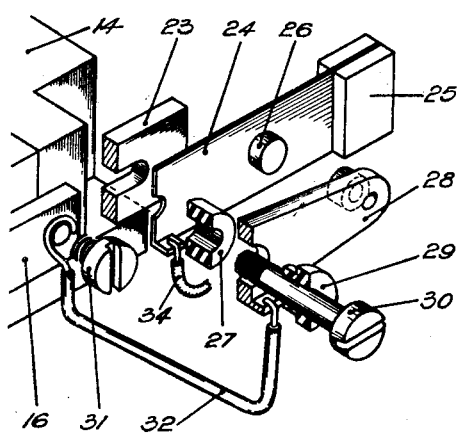
Fig. 3 is a view in perspective of the vibratory reed and adjacent parts.
Figure 4:
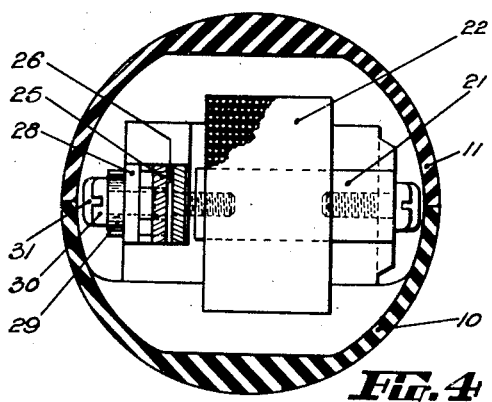
Fig. 4 is a view in cross-section on the line 4—4 of Fig. 1.

The converter comprises an elongated cylindrical housing made for convenience in two halves 10 and 11. The parts are identical in their outside shape and appearance and are moulded of any suitable insulating material to accommodate the parts of the unit and to provide openings for the input and output terminals. The halves of the casing are held securely together by transverse bolts 12 and 13. The bottom portion 10 of the casing is provided at one end with a flat shoulder upon which is arranged a rectangular supporting block 14 of Bakelite or other insulating material. This block is provided with a bore for the passage of the bolt 12 and is securely held in place within the housing by this bolt which effectively clamps it between the shoulder of the bottom part 10 of the housing and inwardly projecting boss on the cover part 11 of the housing.

To the outer or upper face of the supporting block 14 is securely fastened a rectangular fiber bar 15 of the same width as the supporting block. Permanently riveted to the fibre bar 15 are the input terminals herein shown as comprising spaced prongs 16 which are bent to conform to the ends of the bar 15, riveted thereto and extended in parallel relationship through the apertures provided for that purpose in the meeting faces of the housing parts 10 and 11. The output terminals are arranged in sockets formed in the other end of the housing parts and comprise U-shaped members 19 and 20 of spring strip metal. The terminal 19 is extended as an integral strip 18 to the right-hand input terminal prong 16 being permanently screwed thereto. The other output terminal 20 is connected to the left-hand input terminal prong 16 through the vibratory interrupter mechanism which will now be described.

An electro-magnet is rigidly supported within the housing, the supporting means being herein shown as an angle bracket 21 which is screwed to the right-hand side of the supporting block 14 shown in Fig. 1 and has a transverse end portion which locates the coil approximately symmetrically in the longitudinal axis of the housing in a position spaced behind the supporting block 14. The angle bracket 21 is of soft iron and also serves as the core of an electro-magnet which includes the coil 22.

The lower left-hand corner of the supporting block 14 is notched out as herein shown to receive the fixed end of a vibratory reed and an adjustable fulcrum piece by which the length of the reed may be adjusted and its period of vibration regulated. The fulcrum piece comprises a rectangular metal bar 23 having a longitudinal slot therein to receive the transverse clamping screw 30 which is threaded into the body of the block 14. In immediate contact with the outer face of the fulcrum piece 23 is located an elongated vibratory reed 24 of thin spring-tempered metal carrying at its free end an iron armature 25. The reed 24 extends symmetrically across the end of the electro-magnet 21—22 and the armature 25 is located beyond or below the end of the core so that it never strikes the core in the vibration of the reed. The reed also carries upon its outer face a metal contact 26. The reed is also perforated to permit the passage of the clamping screw 30 and against the outer face of the reed is mounted an insulating washer or spacer 27. Outside the spacer is mounted a stationary contact arm 28 which extends substantially parallel to the reed 24 and is provided with inwardly projecting contact disposed opposite to the contact 26 of the reed. The contact arm 28 is bored to receive with clearance the clamping screw 30 and a flanged bushing 29 of insulating material is provided to insulate the contact arm from the clamping screw.

The left-hand input terminal prong 16 is provided at its inner end with a clamping screw 31 and from this extend two lead wires, viz., the wire 32 which is soldered to the contact arm 28 and the wire 34 that leads to one end of the coil 32 through a condenser 33. The condenser is connected in parallel with the reed and contact arm to reduce sparking between the contacts thereon when the circuit is broken by the movement of the reed between the electro-magnet.

The reed is set in vibration by the action of the electro-magnet and the periodic interruption of its energizing circuit by movement of the contact 26 away from the contact of the arm 28. The vibration period of the reed is determined roughly by the weight of the armature attached to its end and more accurately by adjusting the fulcrum piece 23 upon the supporting block 15. It will be apparent that as the fulcrum piece 23 is moved outwardly or downwardly the effective length of the reed is reduced and its period of vibration, therefore, increased. By properly making these adjustments, direct current supplied to the input terminals 16 is converted to an intermittent current with a vibration period corresponding to that for which the dry shaver vibratory motor has been designed, for example, 60 cycles.

Figure 6:
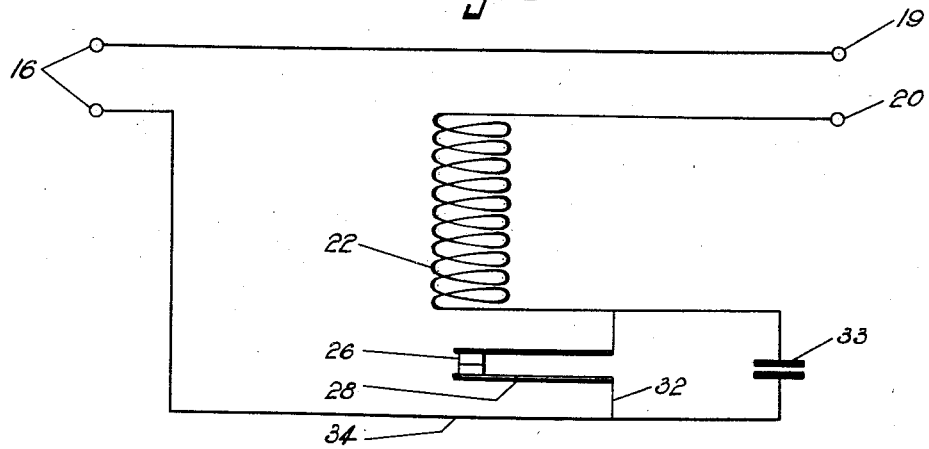
Fig. 6 is a wiring diagram of the converter.

In Fig. 6 is shown the wiring diagram of the converter unit and in this the same reference characters have been employed to designate the diagrammatically depicted elements as were used in Figs. 1 to 4 to indicate the corresponding mechanical parts.

Figure 5:
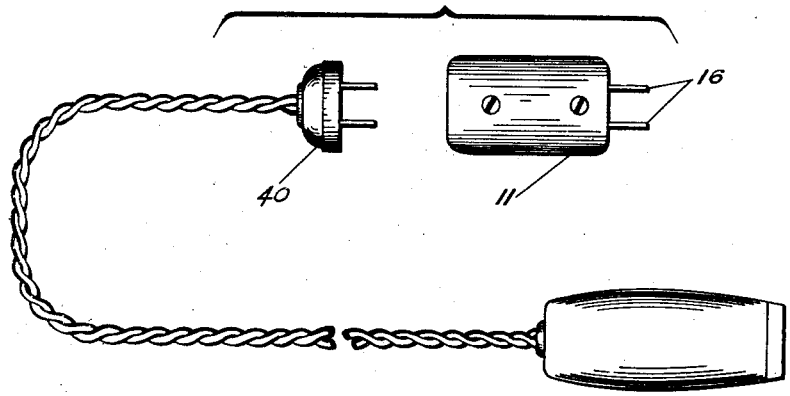
Fig. 5 is a diagrammatic view suggesting the manner in which the converter unit is used.

The manner of using the converter is suggested in Fig. 5 where it may be assumed that the input terminal prongs are to be inserted in a socket of a direct current service line. Then the plug 40 of the dry shaver may be inserted in the output terminals of the converter unit whereupon the shaving implement may be operated efficiently under the service conditions for which it has been designed.

Having thus disclosed my invention and described in detail one embodiment thereof to illustrate but not to limit the invention, I claim as new and desire to secure by Letters Patent:

1. In a converter unit including in its structure input and output terminals, the combination with a stationary insulating block and an electro-magnet supported from one side of said block, a fulcrum piece slotted for longitudinal adjustment in engagement with the other side of said block, a vibratory armature-carrying reed overlying the fulcrum piece and extending into proximity to the magnet, a stationary contact-carrying arm disposed in parallel spaced relation to the reed, and a single clamping screw whereby the said fulcrum piece, reed and arm are all made fast to one side of the insulating block.

2. In a converter unit including in its structure input and output terminals, the combination with a stationary insulating block, of an iron bracket secured to one side of the block and having an inturned end, an electro-magnet supported by said inturned end, a longitudinally adjustable fulcrum piece mounted in sliding contact with the other side of said block, a vibratory reed overlying said fulcrum piece, a contact-carrying arm spaced outwardly from the reed, and means for securing said contact-carrying arm, said fulcrum piece and reed to the same side of the said block.

JOHN A. HANLEY.